Figure 1:
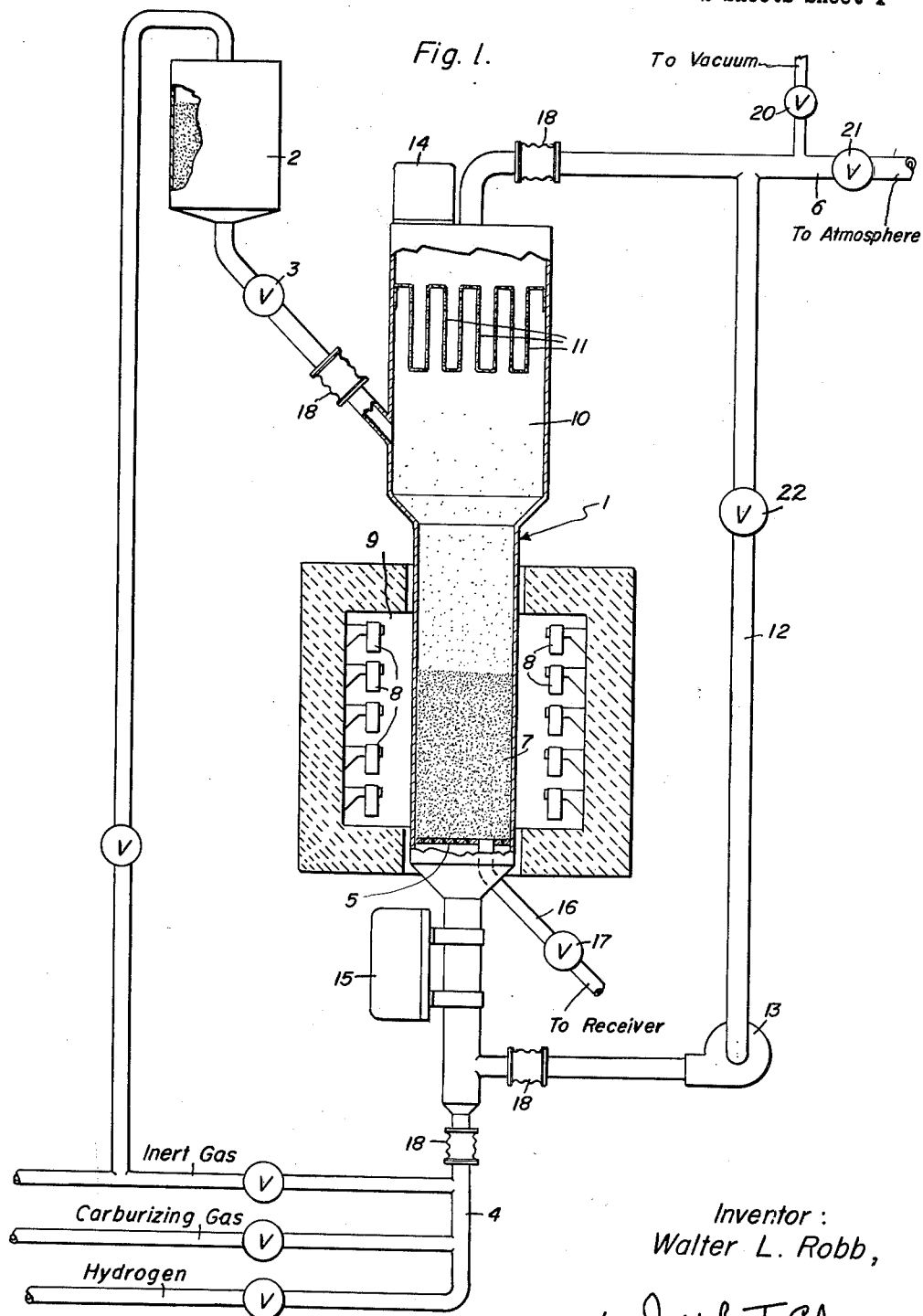

Feb. 12, 1963

W. L. ROBB 3,077,385

PROCESS FOR PRODUCING CARBIDES

Filed Jan. 6, 1959

2 Sheets-Sheet 1

Inventor:
Walter L. Robb,
by Joseph T. Cohen
His Attorney.

Feb. 12, 1963 W. L. ROBB 3,077,385
PROCESS FOR PRODUCING CARBIDES
Filed Jan. 6, 1959 2 Sheets-Sheet 2

Inventor:
Walter L. Robb,
by Joseph T. Cohen
His Attorney.

United States Patent Office 3,077,385
Patented Feb. 12, 1963

3,077,385
PROCESS FOR PRODUCING CARBIDES
Walter L. Robb, Scotia, N.Y., assignor to General Electric Company, a corporation of New York
Filed Jan. 6, 1959, Ser. No. 785,153
7 Claims. (Cl. 23—208)

This invention relates to the production of molybdenum and tungsten carbides. More particularly this invention relates to process of preparing molybdenum and tungsten carbides in a fluidized bed. Still more particularly this invention relates to a process of preparing a metallic carbide which comprises reacting hydrogen with a compound selected from the group consisting of tungsten oxides, molybdenum oxides, tungsten and molybdenum compounds which are thermally decomposable into oxides below the temperature at which the oxides are reduced by hydrogen to the metallic state, and mixtures thereof heated to a temperature of at least 400° C., introducing a carburizing gas into the gas phase of the fluidized bed before the metallic oxide has been reduced sufficiently to the metallic state where the impinging particles agglomerate and continuing the flow of carburizing gas and hydrogen while maintaining the fluidized bed at a temperature of at least 800° C. until the particles are substantially all converted to the metallic carbide.

Tungsten and molybdenum carbides are well known and can be prepared, for example, by those methods described in the book by Schwarzkopf and Kieffer, "Refractory Hard Metals," The McMillan Company, New York, 1953. The methods disclosed in this book comprise reacting carbon or carburizing gases with tungsten or molybdenum metals. Li and Dice describe a process in U.S. Patent 2,535,217 for preparing tungsten carbide by direct reduction of an ore containing tungsten oxide with carbon, such as bituminous coal, in the presence of iron-tin alloys having 5 to 75% tin at a temperature of about 1400° C.

The usual process for the preparation of tungsten or molybdenum carbide comprises refining the ore to the metallic oxide, reducing the oxide to the metal with hydrogen, mixing the metal with carbon and heating, usually in an electric furnace, to temperatures of about 1200° C. or higher until the carbide is formed. Alternatively, the metal can be carburized using a carburizing atmosphere, such as methane or carbon monoxide at temperatures of 800° C. or higher using hydrogen to suppress the formation of free carbon. It has been proposed to prepare tungsten and molybdenum carbides in a fluidized bed by reacting the metal particles with a carburizing gas in a fluidized bed. However, attempts to carry out the reduction of tungsten and molybdenum oxides to metals with hydrogen followed by reaction with the carburizing atmosphere always resulted in incomplete conversion because the bed would not remain fluidized after the tungsten or molybdenum oxide had been reduced to the metallic state. This is apparently due to the production of such a clean metallic surface that the impinging particles weld together into large particles, some as large as marbles.

Newkirk and Aliferis, "Journal American Chemical Society," 79, 4629 (1957) studied the reaction of a methane-hydrogen mixture with various tungsten compounds in a static bed. After further study of this reaction in a thermobalance using tungstic acid, they concluded that reduction to the metallic state was complete before carburization commenced.

Despite the teaching of Newkirk and Aliferis and the failure of the two-step fluidized process, I have discovered that tungsten and molybdenum oxides can be converted to the corresponding carbide in a fluidized bed providing a carburizing gas is introduced into the fluidized bed prior to the point where the impinging particles are sufficiently reduced to the metallic state that they agglomerate causing loss of fluidity in the bed. Preferably the introduction of the carburizing gas should not be delayed beyond the point where the oxide is present as the dioxide. The danger of losing the fluidity of the bed does not warrant delaying the introduction of the carburizing gas beyond this point. The introduction of the carburizing gas before the oxide is completely reduced to the metallic state does not interfere with continued reduction of the oxide nor with the production of the desired carbide.

Although I do not wish to be bound by theory, it appears that the reduction with hydrogen in the absence of a carburizing gas produces particles having such clean metallic surfaces that the impinging particles in the fluidized bed weld together upon impact finally forming a particle size that is too large to be suspended in the gas phase. Evidently, the carburizing reaction produces a carbide coating so quickly that it prevents the formation of this clean metallic surface and the carbide coating prevents welding of the impinging particles into larger ones. The carbide coating on the particles does not prevent migration of the oxygen present in the oxide to the surface where it reacts with hydrogen or, alternatively, diffusion of hydrogen into the particle where it reacts with the oxide. Likewise, the carbon present in the carbide coating can migrate from the surface to the center of the particle so that finally, substantially all of the starting metallic oxide is converted to metallic carbide. As a point of reference, I refer to the reduction step as including the reaction up to the formation of the dioxide and to the carburizing step as being the subsequent reaction even though further reduction takes place during this step concurrently with the carburization.

Figure 2:
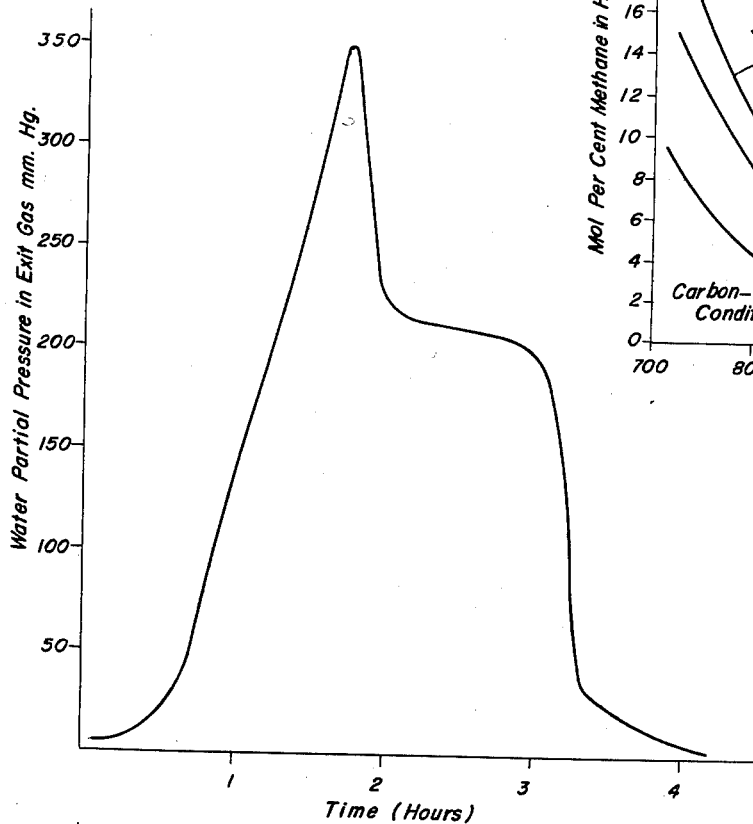
Figure 4:
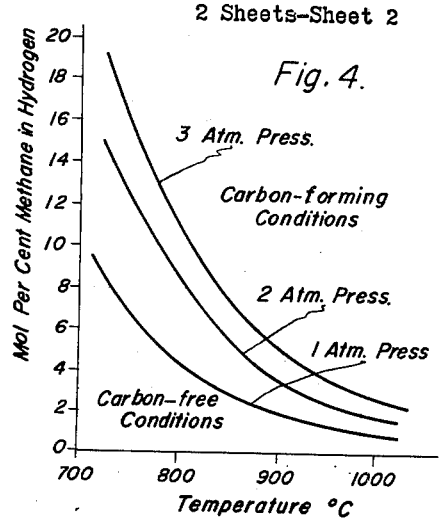
Figure 3:
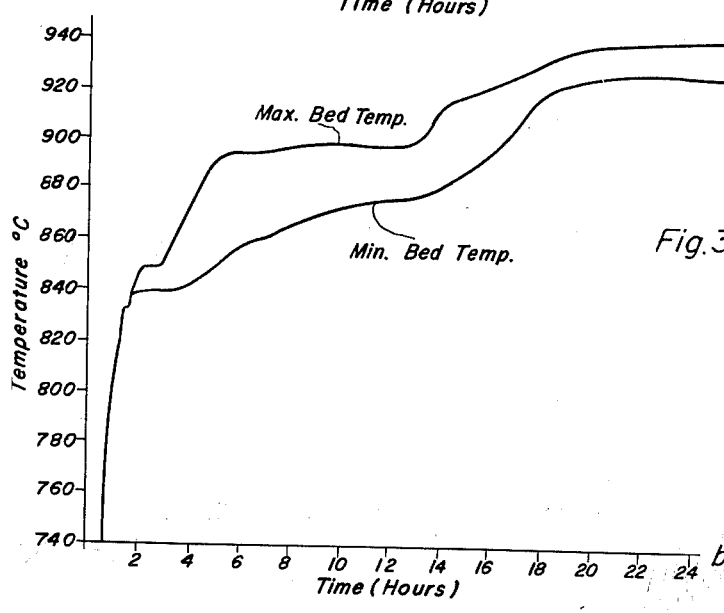

This invention will be easily understood by those skilled in the art from the following detailed description which should be read with reference to the appended drawings. FIG. 1 shows a typical fluidized bed reactor useful in practicing my invention. FIG. 2 shows a typical plot of the partial pressure of water vapor in the exit gas as a function of reaction time when heated as shown in FIG. 3. FIG. 3 is a typical plot of heating cycle as a function of time that can be used in my process. FIG. 4 is a graphical plot of the concentration of methane (a typical carburizing agent) in equilibrium with hydrogen and carbon as a function of temperature with pressure as a parameter. The starting materials for my process may be any of the various oxides of tungsten or molybdenum, or compounds which are easily decomposable with heat into oxides of these metals, examples of which are the ammonium molybdates, the ammonium tungstates, the molybdic acids, the tungstic acids, etc. Such compounds decompose into oxides at temperatures lower than the reaction conditions maintained in the fluidized bed for the reduction reaction of the oxide so that all these materials are full equivalent as starting materials in my process. In place of a single oxide or its equivalent, I may use mixtures of any of these materials including mixtures of molybdenum and tungsten compounds, if a mixed carbide is desired. The size of the oxide particles is not critical, the only criterion being that the size should be small enough that the particles can be readily suspended in the gas stream and yet not so small that they are difficult to separate from the existing gas stream. The velocity of the gas phase in the reactor also is not critical but should be high enough that it is capable of suspending the size particles of metallic compound used and yet not so high that it carries an excessive amount of the solids into the disengaging section. As is well known, the effect of particle size, particle density, and velocity of the gas phase are related, the larger the particle size or the greater the particle density, the higher the velocity that must be used. A discussion of such features as the effect of gas velocity, particle size, particle density, and reactor characteristics applicable to my process is found in many publications on fluidization; such, for example, as the book "Fluidization," edited by D. F. Othmer, Reinhold Publishing Corporation, New York, 1956. In general, I prefer that the conditions of fluidization be so chosen that the net solids flow of the solids in the reaction system is essentially zero and that the gas solid system in the reactor bed is homogeneous as opposed to conditions which cause transport of solids or a non-homogeneous gas solid system due to bubbling, slugging, or channelling of the gas phase through the solid particles. Likewise, the particular gas used for the carburization reaction is not critical. Any of the various known carburizing gases may be used, for example, methane, ethane, propane, butane, benzene, carbon monoxide including gaseous mixtures thereof as well as natural gas, etc., may be used. If the presence of metallic nitride as an impurity in the carbide is not desired, nitrogen should be excluded from the gas phase during the carburizing step. A more complete discussion of the various gases and the conditions surrounding their use as gaseous, carburizing atmospheres is found in the article "Gaseous Media for Carburizing," by Gordon T. Williams, Transactions of the American Society for Metals, 26, 463–82 (1938) and references cited therein.

Referring now to FIG. 1, the metallic oxide, or compound decomposable into an oxide, including a mixture thereof, is charged into the reactor 1 from bin 2 through valve 3. Fluidization of the bed is initiated by introducing an inert gas such as helium, argon, krypton, nitrogen or mixtures thereof through manifold 4 and exhausting it to the atmosphere through valve 21 in exhaust 6 to completely replace all of the air in the reactor before the introduction of hydrogen. Alternatively, the air may be withdrawn through the vacuum leg of exhaust 6 through valve 20 and replaced with an inert gas or hydrogen, repeating the cycle, if necessary. In this case, fluidization may be initiated with hydrogen. The desired gas is admitted through manifold 4 to the bottom of the reactor 1 under sufficient pressure that, in flowing up through the gas distributor 5, such as a perforated plate or plurality of nozzles, it causes the solid particles of oxide to be suspended in the gas phase forming a fluidized bed in section 7 of reactor 1 having the appearance of a liquid. The amount of oxide charged is usually calculated so as to provide a bed height within section 7 corresponding to the zone which is capable of being heated by heaters 8 which can be contained in an insulated furnace 9 to conserve heat and minimize temperature fluctuations. Section 10 is provided as a disengaging zone to separate the solids from the gas phase. Extremely fine solids are removed on filters 11 before the gas is either exhausted to the atmosphere through valve 21 in exhaust stack 6 or recirculated to reactor 1 through valve 22 in leg 12 by compressor 13 adding make-up gas, if desired, from manifold 4 to obtain the desired concentration of gases. Normally the gas is exhausted to the atmosphere during the reduction step otherwise provisions must be made for condensing the water vapor from the gas before recirculating. The disengaging section 10, filters 11 and the lines leading to the exhaust system 6 should be maintained at a temperature sufficient to prevent condensation of the water vapor formed in the reduction step from condensing on their surfaces. Nominally the gas phase is hot enough to heat these surfaces but auxiliary heaters may be used if desired. The reactor can be provided with knocker 14 and vibrator 15 to prevent plugging of the system and to aid in fluidization of the particles. When such vibrators are used, it is desirable to use flexible connectors 18 to connect reactor 1 to the balance of the system. Material is discharged from the reactor through discharge chute 16 by opening valve 17. Usually sufficient product is left in chute 16 to fill it to the level of the gas distributor plate 5 to prevent oxide from the next run from entering. In order to properly monitor the course of fluidized bed reactions, it is standard procedure to have pressure taps, not shown, so positioned that the pressure drop can be readily measured across the gas inlet distributor and between the top and bottom of the fluidized bed and in the disengaging section. The temperatures in the various zones can also be measured by suitably placed thermocouples, not shown. Hydrogen can be introduced at any time after there is no danger of forming an explosive mixture, e.g., when substantially all of the air has been displaced from the reactor or its introduction can be delayed until the fluidized bed is at the temperature at which the reduction of the oxide is to be performed. Usually, the temperature maintained during the reduction step is lower than the temperature for the carburizing step although it normally is allowed to increase during the reduction step to the temperature desired for the initiation of the carburization reaction.

The carburizing gas may be introduced into the hydrogen at any time prior to the reduction of the oxide to the dioxide state. There is no advantage to be gained by early admission since the carburizing reaction apparently does not start until the oxide has been reduced to at least the dioxide state. Therefore, I prefer to introduce the carburizing gas at about the time the metallic oxide has been reduced to the dioxide state. The point at which the metallic oxide has been reduced to the dioxide state can be readily determined by monitoring the partial pressure of the water in the exit gas and plotting the value as a function of time, a typical plot of which is shown in FIG. 2.

The monitoring of the exit gas is conveniently done by use of thermoconductive cells which have been calibrated for the gas system being used. Alternatively a dew point indicator can be used to measure the water content of the exit gas. Prior to the introduction of the carburizing gas into the fluidized bed, the temperature for the reduction step with hydrogen is usually not critical providing it is at least 400° C. However, the temperature should not be so high that the structural components exceed their design limitations or the vapor pressure of the solid reactants is increased to the point that the tungsten or molybdenum value is vaporized. As an example, if molybdenum trioxide is present either initially or as an intermediate, the temperature should not exceed substantially 500° C. and preferably 450° C. until this oxide has been reduced to a lower oxide state. Within the limits of these considerations, I prefer to carry out the reduction step in the temperature range of 400–1000° C. There is a minimum temperature of 800° C. below which the carburizing reaction does not occur at an appreciable rate. Therefore, if agglomeration is to be prevented, the temperature must be at least 800° C. and preferably 825–850° C. by the time the dioxide state is reached and the carburization reaction initiated. There is also a maximum temperature which must not be exceeded when the carburizing gas is present to prevent the formation of free carbon. Preferably, I carry out the carburization reaction in the range of 800–1000° C. The temperature at which the carburizing gas will deposit free carbon is readily determined from available physical chemical data on the equilibrium existing between the carburizing gas and its constituents, using methods described in the literature, e.g., the previously mentioned article by Williams and references cited therein and the book "Metallurgical Therochemistry," by O. Kubaschewski and E. Ll. Evans, John Wiley and Sons, New York, 2nd edition, 1956, and the references cited therein.

Using methane as a typical carburizing gas, the equilibrium for the thermal decomposition of methane can be represented by the following equation:

$$CH_4 \rightleftarrows C + 2H_2$$

The equilibrium constants at various temperatures are well known or can be calculated by known methods from known thermodynamic data, e.g., "Selected Values of Physical and Thermodynamic Properties of Hydrocarbons and Related Compounds," American Petroleum Institute, Carnegie Press, Pittsburgh, 1953, and "Selected Values of Properties of Hydrocarbons," National Bureau of Standards Circular 461, U.S. Department of Commerce, Washington, D.C., 1947. Using these equilibrium constants, a plot can be made similar to that shown in FIG. 4. From this figure, it can be seen that, if the total pressure of the gas mixture is increased, the amount of methane in the hydrogen can be increased for any given temperature. This figure can also be used to determine the maximum amount of methane that can be present in hydrogen for any given set of temperature and pressure condition without depositing free carbon. For example, at a temperature of 850° C. and a total gas pressure of one atmosphere, there can be a maximum of approximately 2.75% methane in a methane-hydrogen mixture without forming carbon. At the same temperature, but at a total gas pressure of two atmospheres, the maximum concentration of methane is 5.4% and at three atmospheres total pressure, it is 7.4%. Thus, it is readily seen that there are three variables which control the deposition of free carbon, viz., the temperature, total gas pressure, and the percent of carburizing gas. One skilled in the art will readily recognize that the curves similar to FIG. 4 may be readily constructed for any of the other available carburizing gases using the methods previously referenced. Therefore, the particular carburizing gas used affects the choice of these three variables in maintaining carbon free conditions.

As the gas phase rises through the fluidized bed the concentration of the methane decreases because of its reaction with the fluidized particles to form carbide. Although not necessary, this decrease can be compensated for, if desired, in either of two ways. Methane can be added at points intermediate between the bottom and top of the bed or the heaters may be maintained at selected temperatures so that a temperature gradient increasing from bottom to top is maintained in the fluidized bed. This gradient can be maintained to more or less match equilibrium conditions corresponding to the methane concentration gradient. This effectively permits the surface formation of the carbide to be carried out at the temperature of the bottom of the bed and the diffusion of the carbon into the exterior of the particle to be carried out at the higher temperature at the top of the bed without excessive carbon formation.

The deposition of some free carbon on the particles is not detrimental to my process and can be controlled by control of the carburizing gas concentration so that the amount of free carbon of the carbide product is within a desired range as determined by the end use. However, the temperature of reactor components, such as the filters 11 and gas distributor 5 should not be so high that they become clogged with deposited carbon due to decomposition of the carburizing gas.

In order that those skilled in the art may readily understand my invention, the following examples are given by way of illustration and not by way of limitation. It is readily apparent that variations from the specific reaction conditions and reactants given may be readily used without departing from the scope of my invention. In carrying out these examples, a reactor was used which was constructed of Inconel, an alloy whose chief ingredients are approximately 80% nickel, 13% chromium, with the balance being iron except for small amounts of other ingredients. Section 7 was 2 inches in diameter by 4 feet high. The gas distributor plate 5 was porous stainless steel. Concentrically joined to the top of the reactor section 7 there was a 3 inch diameter by 18 inch high disengaging section 10 containing two bayonet-type, porous stainless steel filters 11 for separating entrained powder from the exiting gas stream. The reactor 1 was electrically heated by means of five separate heaters 8 in individual furnaces 9 so that the reactor could have five separate temperature zones. Alternatively, the furnaces could be gas-fired. Thermocouples were so situated that the temperature in each of the furnaces and in the reactor bed of each furnace zone could be measured, and pressure taps were provided for monitoring the distributor pressure drop, the bed pressure drop and the filter pressure drop. The composition of the feed and exit gases could be continuously determined by the use of thermoconductivity gas analyzers which were calibrated to determine water-in-hydrogen and methane-in-hydrogen. If both water and methane are present in significant quantities, the water must be determined by an independent method, such as determination of dew point for which recorders are available. Methane was used initially since it is typical of the carburizing gases and can be obtained pure. It was desired to use a pure gas to eliminate any effects which fluctuations in the gas composition might have on the reactor.

*Example 1*

The reactor 1 was charged with 1510 grams of a milled brown tungsten oxide containing 18.2% oxygen. The reactor was evacuated through the vacuum line in exhaust stack 6 and the tungsten oxide swept in from bin 2 by a stream of nitrogen used to break the vacuum. Zero time was taken as a time when the heaters 8 were turned on. The bed was fluidized from the beginning using a stream of hydrogen. FIG. 2 shows a plot of the partial pressure of water in the exiting hydrogen stream as a function of time during the first four hours by which time the reduction reaction was essentially complete as shown by the very small amount of water in the exit gas. FIG. 3 shows the maximum and minimum bed temperatures during the first reaction period as a function of time. The lowest temperature was at the bottom and the highest temperature was at the top of the fluidized bed at any particular time. The curves in FIGS. 2 and 3 have been smoothed out to average the results of several runs so as to eliminate fluctuation due to experimental and operational variables. The first steep vertical slope in FIG. 2 indicates the start of the reduction process which occurred at a bed temperature of 560° C. (not shown in FIG. 3). After one hour and forty-five minutes, the quantity of the water given off became a maximum and thereafter decreased. By this time, the temperature of the bed had been raised to 830–840° C. as shown in FIG. 3. At the end of approximately two hours, the quantity of water in the exit gas leveled off to a fairly constant value for the next hour. The beginning of this one-hour period was the point where the tungsten was present as the dioxide and the time when methane was introduced into the hydrogen stream. The reduction reaction still proceeded as indicated by the fact that water continued to appear in the exit gases over a period of two hours after the introduction of the methane. During the first hour of this two-hour period, the bed temperature was maintained in the range of 840–850° C. Thereafter, the temperature was controlled as shown in FIG. 3 for the balance of the first 25½ hours. The concentration of methane when first introduced into the hydrogen was approximately 0.7%. All percentages of methane in hydrogen are mol percent. The methane concentration was increased to 1.2% at the end of 2¾ hours and then increased to 2.4% for the balance of the 25½ hours. An analysis of the tungsten carbide at this stage showed that the product had 5.7% combined carbon and 0.0% free carbon. All analyses are weight percent. The reaction was continued for a second stage in the temperature range of 930–950° C. for an additional six hours. During this period the methane concentration in inlet hydrogen stream was approximately 3%. At the end of this time an analysis of the product showed 5.93% combined carbon and 0.075% free carbon. Further carburization was carried out in the temperature range of 940–960° C. using methane concentrations in the inlet hydrogen stream of 2 to 2¼%. After six hours at this higher temperature range, analysis of the product showed a total carbon content of 6.28% of which 0.12% was free carbon. On this basis, the product analyzed 6.16% combined carbon which, within the limits of experimental error, is the theoretical amount of combined carbon (6.13%) for tungsten carbide having the formula WC. The flow of gas was continued until the product had cooled to below 400° C. The hydrogen was purged out of the reactor with dry nitrogen gas, and the powder was swept through discharge tube 16 in which nitrogen gas was being pumped out of the reactor by application of a vacuum on the receiver, not shown. The inlet gas pressure during the entire run was maintained between 19 and 20 lbs. per square inch absolute which is equivalent to approximately 1⅓ atmospheres. Referring now to FIG. 4 and interpolating between the curves for 1 and 2 atmospheres, it will be seen that during the first part of the reaction where the inlet gas composition was 2.4% methane and the maximum bed temperature was 900° C. that the conditions were operated just below the temperature at which the methane would form carbon. However, it should be pointed out that, for the first eleven hours of the run, analysis of the exit gas showed that there was no more than 0.25% methane in the exit gas so that the methane content varied within the fluidized bed from an inlet composition of 2.4% to an outlet composition of 0.25% at the top of the bed. During the balance of the first 25½ hours when the temperature was in excess of 900° C. some deposition of free carbon may have formed, but if so, it did not interfere with the process and readily reacted to form tungsten carbide since an analysis of the product at the end of this time showed there was no free carbon present. The methane concentration in the exit gas gradually increased after eleven hours from 0.25% to 2.0% at the end of 23 hours. During the second part of the experiment, where the inlet gas contained 3% and the outlet gas 2½ to 2¾ % methane and the temperature was in the range of 920–940° C. some free carbon was forming, but not sufficient to cause trouble in the process or in the operation of the equipment. In fact there is some evidence that a small amount of deposition of carbon is desirable since the carburization reaction apparently is speeded up in the presence of small amounts of free carbon. As FIG. 4 shows, a temperature of 920–940° C. at 1⅓ atmospheres requires that the methane be less than 2% and 940–960° C., maintained during the third part of the reaction, requires that it be between 1½ and 1¾%. Since the methane concentration was in the range of 2 to 2¼% at the inlet and 1¾ to 2% at the outlet during the third part of the reaction some carbon deposition occurred. The deposition of carbon is confirmed by the analysis of the products at the end of the second and third steps. From a commercial standpoint, it is sometimes desired that the tungsten carbide have a very small amount of free carbon. Therefore, by selecting the proper gas composition and the right temperature conditions, it is possible to control the product so that it will contain as much or as little as one desires.

*Example 2*

Example 1 was repeated, except that tungsten trioxide, WO₃ (blue tungsten oxide), was substituted for the brown tungsten oxide. Reduction to the tungsten dioxide began when the reactor temperature reached 450° C. and proceeded as easily as in Example 1, except that it took slightly longer. Thereafter, the carburization reaction proceeded identically with Example 1 to yield tungsten carbide having the formula WC.

*Example 3*

Example 1 was repeated, except that ammonium paratungstate was substituted for the brown tungsten oxide. The ammonium paratungstate decomposed to tungsten trioxide, ammonia and water before the bed temperature reached 400° C. Thereafter, the reduction and carburization reactions were essentially identical to Example 2 to give tungsten carbide having the formula WC.

*Example 4*

In the same manner as in Example 3, tungstic acid is substituted for the brown tungsten oxide in Example 1. The tungstic acid begins to decompose as soon as the bed temperature reaches 100° C. and is essentially completely decomposed to tungsten trioxide by the time the bed temperature reaches 300° C. Thereafter, the reaction proceeds as in Example 2 to yield tungsten carbide having the formula WC.

*Example 5*

When ammonium molybdate was substituted for the ammonium paratungstate of Example 3, ammonia gas and water began to be evolved at 100° C. It was necessary to decrease the rate at which the bed was heated so that the temperature did not exceed 500° C. until enough water could be accounted for in the exit gas to insure that the oxide was at an oxidation state intermediate between MoO₃ and MoO₂ to prevent volatilization of some of the MoO₃. Thereafter the heating rate and conditions of Example 1 is used to produce molybdenum carbide having the formula MoC.

*Example 6*

Example 1 was repeated, except that natural gas, supplied from the regular city gas main, was substituted for methane as the carburizing gas. The conditions necessary to provide tungsten carbide having the formula WC using natural gas were essentially the same as for the use of methane as the carburizing gas, thus establishing that natural gas is the full equivalent of methane as a carburizing gas in my process.

As is well known, methane is more stable to thermal cracking than the other alkanes, e.g., ethane, propane, and butane, which tend to crack to form methane, carbon, and hydrogen but these latter materials are more thermally stable than alkenes, e.g., ethylene and propylene and aromatic hydrocarbons, e.g., benzene and toluene which tend to crack to carbon and hydrogen. This means that the concentration of these gases would have to be lower than methane when used in my process and, therefore, the carburization would proceed slower. Because of this, I prefer to use methane preferably in the form of natural gas as the carburizing gas in my process.

As will be readily apparent to those skilled in the art, many variations can be made from the conditions pointed out above without departing from the scope of the invention. For example, when starting with a dioxide or an oxide which reduces in one step to the metal, i.e., with no intermediate oxides being formed, the carburizing gas will have to be introduced into the hydrogen on or before the temperature is reached where reduction of the oxide occurs, otherwise, agglomeration will occur. In other words, the conditions of the reaction would be as in Example 1 starting with the addition of methane.

Changes may also be made in the equipment used for carrying out my invention. For example, the filters may be replaced with cyclone separators or other devices used for separating solids from gases and the dimensions of the reactor may be different than those given in Example 1, etc. Valve 17 may be so constructed and placed that it closes discharge chute 16 flush with distributor plate 5.

The products of this invention can be used in any of those applications where tungsten carbide, and molybdenum carbide have previously been used. For example, in the preparation of abrasives, high speed cutting tools, drill bits, and the like; or they may be used for the making of base plates, bearings or other wear resistant surfaces.

It is to be understood that changes may be made in the particular embodiments of the invention described which are within the full intended scope of the invention as defined by the appended claims.

What I claim as new and desire to secure by Letters Patent of the United States is:

1. The process of preparing a metallic carbide which comprises (1) reacting hydrogen with fluidized, solid particles of a compound selected from the group consisting of tungsten oxides, molybdenum oxides, tungsten and molybdenum compounds which are thermally decomposable into oxides below the temperature at which the oxides are reduced by hydrogen to the metallic state, and mixtures thereof, in a fluidized bed of the solid particles suspended in the hydrogen gas phase, heated to a temperature of at least 400° C., (2) heating the fluidized bed to a temperature of at least 800° C. and introducing a carburizing gas into the hydrogen gas phase of said fluidized bed of solid particles before the metallic oxide particles have been reduced sufficiently to the metallic state where the impinging particles agglomerate and (3) continuing the flow of carburizing gas and hydrogen while maintaining said fluidized bed of solid particles at a temperature of at least 800° C. until the solid particles are substantially all converted to the metallic carbide having the formula MC where M is selected from the group consisting of molybdenum and tungsten.

2. The process of claim 1 wherein the fluidized particles reacted with hydrogen are tungsten oxide.

3. The process of claim 1 wherein the fluidized particles reacted with hydrogen are molybdenum oxide.

4. The process of claim 1 wherein the carburizing gas is natural gas.

5. The process of preparing a metallic carbide which comprises (1) reacting hydrogen with fluidized solid particles of a compound selected from the group consisting of tungsten oxides, molybdenum oxides, tungsten and molybdenum compounds which are thermally decomposable into oxides below the temperature at which the oxides are reduced by hydrogen to the metallic state and mixtures thereof in a fluidized bed of the solid particles suspended in the hydrogen gas phase heated to a temperature in the range of 400–1000° C., (2) initiating the flow of a carburizing gas into the hydrogen gas phase of said fluidized bed of solid particles, maintained at a temperature of 800°–1000° C., before the fluidized, solid particles have been reduced sufficiently to the metallic state where the impinging particles agglomerate, and (3) continuing the flow of the carburizing gas and hydrogen while maintaining said fluidized bed of solid particles at a temperature in the range of 800°–1000° C. until the solid particles are substantially all converted to the metallic carbide having the formula MC where M is selected from the group consisting of molybdenum and tungsten.

6. The process of preparing a metallic carbide which comprises (1) reacting hydrogen with fluidized solid particles of a compound selected from the group consisting of tungsten oxides, molybdenum oxides, tungsten and molybdenum compounds which are thermally decomposable into oxides below the temperature at which the oxides are reduced by hydrogen to the metallic state and mixtures thereof in a fluidized bed of the solid particles suspended in a gas phase heated to a temperature of at least 400° C., (2) initiating the flow of a carburizing gas into the hydrogen gas phase of said fluidized bed of solid particles, maintained at a temperature of at least 800° C., at the time when the fluidized solid particles are essentially in the form of the dioxide, and (3) continuing the flow of carburizing gas and hydrogen while maintaining said fluidized bed of solid particles at a temperature of at least 800° C. until the solid particles are substantially all converted to the metallic carbide having the formula MC where M is selected from the group consisting of molybdenum and tungsten.

7. The process of preparing a metallic carbide which comprises (1) reacting hydrogen with fluidized solid particles of a compound selected from the group consisting of tungsten oxides, molybdenum oxides, tungsten and molybdenum compounds which are thermally decomposable into oxides below the temperature at which the oxides are reduced by hydrogen to the metallic state and mixtures thereof in a fluidized bed of the solid particles suspended in the hydrogen gas phase heated to a temperature in the range of 400°–1000° C., (2) initiating the flow of a carburizing gas into the hydrogen gas phase of the fluidized bed of solid particles, maintained at a temperature of 800°–1000° C., at the time when the fluidized, solid particles are essentially in the form of a dioxide, and (3) continuing the flow of carburizing gas and hydrogen while maintaining the said fluidized bed of solid particles at a temperature in the range of 800°–1000° C. until the solid particles are substantially all converted to the metallic carbide having the formula MC where M is selected from the group consisting of molybdenum and tungsten.

References Cited in the file of this patent

UNITED STATES PATENTS

| | | |
|---|---|---|
| 1,996,185 | Wulff | Apr. 2, 1935 |
| 2,686,819 | Johnson | Aug. 17, 1954 |
| 2,866,697 | Elliott | Dec. 30, 1958 |

FOREIGN PATENTS

| | | |
|---|---|---|
| 778,267 | Great Britain | July 3, 1957 |